Nov. 11, 1924.
1,514,985
W. R. MYERS
PROCESS OF POSITIONING MATERIALS
Filed May 19, 1919
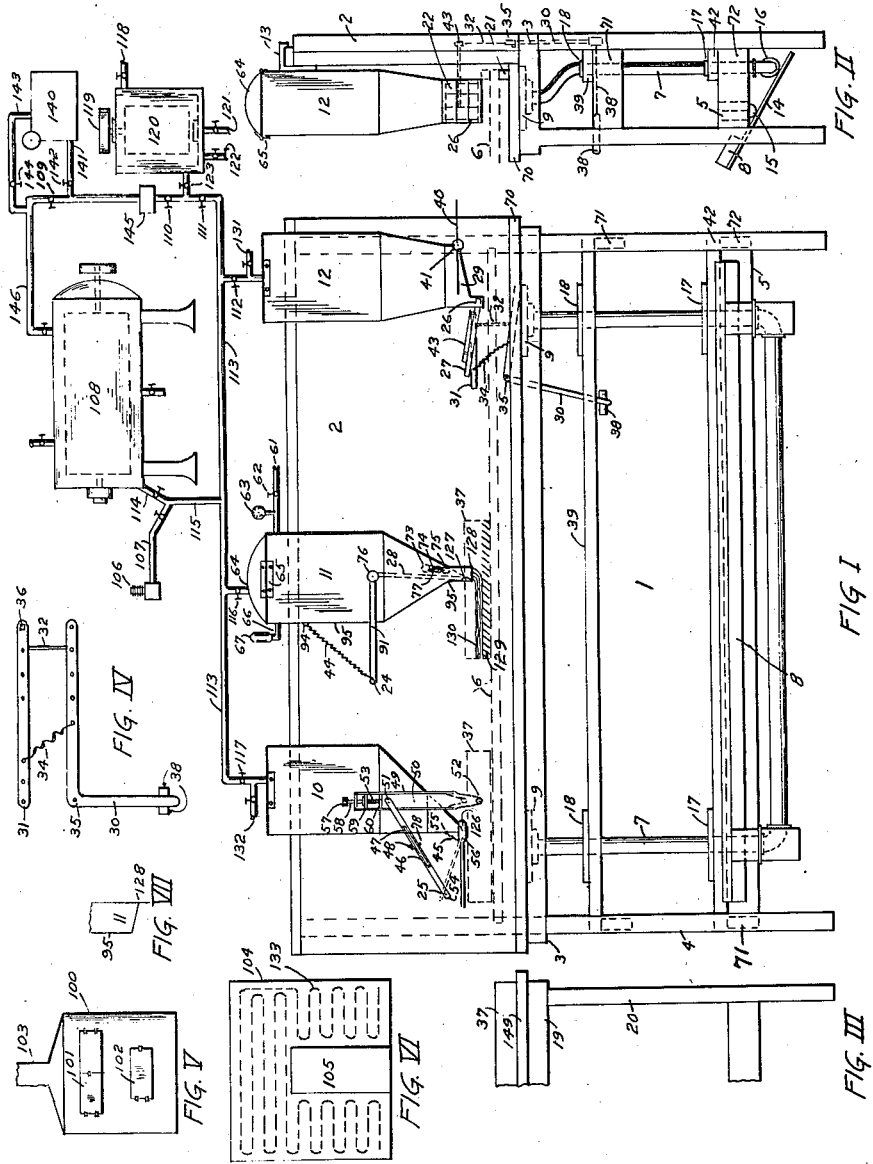
WITNESS
INVENTOR:
Wilson R. Myers,
BY Charles P. Mabee
ATTORNEYS.

Patented Nov. 11, 1924.

1,514,985

UNITED STATES PATENT OFFICE.

WILSON R. MYERS, OF PORTLAND, OREGON, ASSIGNOR, BY DIRECT AND MESNE ASSIGNMENTS, OF ONE-THIRD TO GEORGE W. BURT AND ONE-THIRD TO GEORGE W. WEATHERLY, BOTH OF PORTLAND, OREGON.

PROCESS OF POSITIONING MATERIALS.

Application filed May 19, 1919. Serial No. 298,248.

*To all whom it may concern:*

Be it known that I, WILSON R. MYERS, of the city of Portland, county of Multnomah, and State of Oregon, have invented certain new and useful Improvements in Processes of Positioning Materials, of which the following is a clear specification.

The object of the invention is to provide a method of forming or building up composite slabs or bricks of ice-cream, layer cakes and other bakery and confectionery products under such conditions as to maintain a high standard of sterility; to avoid depreciation incident to expulsion of air or vapor, necessary to lightness or inflation, by compression or molding conducted in accordance with present commercial methods; to minimize the time required in handling the materials and cost incident to the use of extreme temperatures in order to compensate in some degree for reduction due to manipulation; and to eliminate the loss which is consequent upon the employment of auxiliary implements, such as ladles and paddles required in the present practice as a means of transferring and packing the materials to produce the required form of the commercial product.

In explanation with particular reference to the handling of ice-cream, it may be stated that the present method of handling by ladle and paddle in transferring to and arranging in molds to form bricks, affords an opportunity for the introduction of foreign substances through carelessness or lack of skill, involves by pressure the reduction in volume of the product by expression of the air, results in a loss of a portion of the product through the dipping of the utensils in a bath from time to time to remove accumulations thereon due to adhesion, and necessitates reducing the temperature of the product several degrees lower than required for the finished article so as to allow for a loss during the period required in the packing operation and resulting from the pressure which is applied to the material, and additionally a sharp line of demarcation between the layers is unobtainable because of lack of uniformity in the introduction of the successive charges of the materials.

With reference to the drawings the apparatus shown is well adapted to carry out my process for the production and positioning of materials, but parts of the apparatus may be duplicated as to their function by other devices without deviating from my invention.

In the accompanying drawings,

Fig. 1 is a front elevation of an apparatus adapted for carrying out the process of the invention.

Fig. 2 is a side elevation on the same.

Fig. 3 is an elevation of the end of a supplemental table or bench to which the containers are transferred after having been filled.

Fig. 4 is a detailed view of a valve-operating device shown in Fig. 1 as applied to the primary receptacle.

Fig. 5 is a front elevation of an oven constituting one of the tempering devices employed in carrying out this process.

Fig. 6 is a similar view of a refrigerating apparatus constituting another of the tempering devices alternatively used as a tempering means.

Fig. 7 is a detailed view of one of the valves.

Referring to the drawings 1 is a positioning machine the elevated plane of which is shown at 6 and the stationary plane of which is shown at 70, surrounded by the brace 3 and supported by the legs 4. Positioned upon the machine is the vertical support 2 for the attachment thereto at 13 of the receptacles shown at 10, 11 and 12. The positioning machine 1 is provided with cross braces shown at 71 and 72, and a longitudinal brace shown at 5 for the support of the foot lever shown at 8. The foot lever 8 is connected with the standard 7 for the elevation of the longitudinal section shown in elevation at 6. A longitudinal brace shown at 39 supports the guide bearing shown at 18, and the longitudinal brace 42 supports the guide bearing 17.

The bar 14 attached to the swinging joint 15 is firmly attached to the foot lever 8, and at its outer extremity, by its support to the wheel 16, is suitably adapted to elevate the standard 7, when pressure is applied to the foot lever 8. The standard 7 is provided with the locking flange shown at 9, which is firmly attached to the longitudinally disposed plane shown in elevation at 6.

A guide attachment is shown at 21 to prevent the moulds as shown at 37, from getting out of line with the outlets of the receptacles 10, 11 and 12, and the guide attachment 21 is seen in rear attachment to the plane shown in elevation at 6 in Fig. 2.

The knee lever shown at 30 is pivoted at 35 and connected by the rod 32 with the lever 31 which is connected with the knee lever 30 by the spring 34. The lower extremity of the knee lever 30 is fastened to the horizontal rod 38, running beneath the cross support 39, to the front of the machine.

The horizontal rod 38 is pivoted at the center. The lever 31 is pivoted in the square hole shown at 36, and in the square hole 36 is fitted the square rod 43 which connects with the lever 27 which connects with the valve 26 on receptacle 12.

When the horizontal rod 38 is forced to the left, 30 moves to the right carrying its horizontal part upwards forcing 31 by means of the connecting rod 32 in the same upward direction. 31 being pivoted on 36 turns the square rod 43 in hole 36 thereby opening the valve 26 in receptacle 12. When the horizontal rod 38 is released the spring 34 pulls the mechanism to a neutral position thereby closing valve 26.

A slide valve used for forcing the mix out of the lower portion of 12 is shown at 40. This slide valve forces the mixes out of lower portion of the receptacle 12, in layer form, and the mix so formed for layer purposes passes through the opening of the valve 26. The slide valve 40 passes through the longitudinally disposed socket opening 41.

The upper portion of receptacle 11 is provided with the cover 64 which is hinged at 65 to the body of 11. The pipe 61 provided with the valve 62 and the compressed air gauge 63, is firmly attached to the receptacle 11, which is provided on its opposite side with the pipe 66, to which is attached the blow-off valve shown at 67.

The receptacle 10 is provided with an automatic valve which is opened and closed by the lifting and lowering of the moulds to receive the layer formation from the receptacle 10. When the mould is raised through the lowering of the foot board 8, the standard 7 is elevated carrying with it the horizontal plane shown at 6, upon which is placed the mould shown at 37, the upper portion of the sides of the mould come in contact with the lower extremity of the lifting cam 50, at 52. The lifting cam 50 is provided with a perforation at 51, and through 51 is a rivet connecting the bar 47 to the lifting cam 50. The lower end of the bar 47 is connected by a slotted joint shown at 48 for the movement therein of the bar 46 which is attached to the lever 25 at 54. The bars 46 and 47 are connected at the slotted joint 48 with the thumb screw 78.

Firmly attached to the wall 55 of receptacle 10 is a cushioned spring shown at 45, the opposite end of the spring being attached to the lever 25 at 56. The lifting cam 50 moves up and down in the slot 49 which is firmly attached to the front wall of receptacle 10. To the upper extremity of the lifting cam 50 is firmly attached the cushion spring 53, which, at its upper extremity, is attached to the protuberance shown at 58 which is provided with a threaded hole for the reception of the thumb screw shown at 57. At 59 is shown an adjustable plate to the lower surface of which is attached the spring shown at 53. At 60 is shown a plate firmly attached to the upper extremity of the cam 50.

By disconnecting the adjustable thumb screw shown at 78 the valve 126 can be operated by hand through the raising and lowering of the lever shown at 25, and the thickness of the layer can also be regulated.

The valve 127 in receptacle 11 consists of an obliquely positioned plate to which is attached the vertically disposed bar 28 pinioned at 76 with the horizontally disposed bar 91 which is provided at its outer extremity with the perforation 24 to which is connected the spring 44 attached at its upper extremity with the hook shown at 94 attached to the wall 95 of receptacle 11.

When the left inside end of the mould 37 is properly positioned against the end wall 95 of receptacle 11, the operator pulls down the lever 91 and the obliquely disposed valve 127 is moved upward and to the right permitting the materials to pass out of the receptacle 11 into the mould 37 and when the mould starts to fill it is moved uniformly to the left until a layer like formation, as shown at 130, is spread lengthwise of the mould at which time the horizontal bar 21 is released, and the spring 44 draws the valve 127 to a neutral position.

73 is a horizontally disposed rod firmly attached to the front and rear walls of receptacle 11. To 73 is firmly attached the rod 77 which is surrounded by the spiral spring 74, the lower extremity of the rod 77 passing through an opening in the rod 75 which is attached to the valve 127. By means of this mechanism when the lever 91 is pulled downward the upper portion of the valve 127 moves slightly upward while the lower portion to the right away from the wall 95 thus enabling the materials in receptacle 11 to pass through the positioning nozzle 128 into the mould shown at 37.

At 129 is shown a lower layer of materials in mould 37 discharged from receptacle 12, and at 130 is shown a portion of a layer discharged from receptacle 11, or, in other words, the positioning function of the nozzle 128 is shown in operation at 130.

In practicing my invention the materials to be positioned are placed in the container shown at 120, which is of a conventional type provided with a jacket for the reception of either a heating or cooling medium, and provided with a central shaft to which internal moving parts are firmly attached for rotation by means of pulley 119.

After the materials have been subjected to agitation and temperature treatment they are forced by the pump 145 through pipe 141, into the homogenizer 140, and passed through connections 143 and 146 to the conventional ice cream freezer shown at 108, and thence through pipes 114 and 115 to the longitudinally disposed pipe 113, from which the materials are distributed by the pipes dropping down therefrom to the vertically disposed receptacles shown at 10, 11 and 12, or, the materials treated in the container 120 may pass directly to the horizontal pipe 113 without passing through the freezer 108. The homogenizing step, and other steps may be omitted, in various instances, if desired.

In practicing the invention, where the materials treated consist of an ice cream mix, and where it is desirable to use different coloring and flavoring materials in the production of ice cream bricks, different colors and flavors may be introduced from freezers connected with the pipes shown at 132 adjacent to the upper surface of receptacle 10 and to the pipe connection shown at 131 adjacent to the upper surface of the receptacle 12, the third mix being fed into container 11 from the freezer shown at 108. The valve connections provided in the line pipes and connections provide suitable directing methods to divert flow and pressures where other freezers are to be connected as explained. It is obvious that materials may be directly introduced into receptacles 10, 11 and 12, without deviating from the invention as to the positioning and finishing features.

In practice the receptacles 10, 11 and 12, are filled to about three-quarters of their capacity, and, as a rule, three different products are employed, one flavored with vanilla, one with strawberry colored pink, and one with chocolate. When the receptacles are filled and ready for operation, a mould is placed in the horizontal plane shown at 6, under hopper 12. Then by means of the foot lift shown at 8 the horizontal plane is elevated bringing the mould up to the mouth of the nozzle of receptacle 12.

The operator then moves the knee lever 38 to the left, which moves 30 to the right carrying its horizontal part upwards forcing 31 by means of the connecting rod 32 in the same upward direction, and, as 31 is pivoted on 36 it turns the square rod 43 in hole 36 thereby opening the valve 26 in receptacle 12, and, when the horizontal rod 38 is released, the spring 34, pulls the mechanism to a neutral position thereby closing valve 26.

Simultaneously with the opening of the valve 26 the operator uniformly moves the mould to the left allowing the materials as they discharge to form a uniform layer of materials upon the base or bottom of the mould, and when the layer is substantially completed the horizontal rod 38 is released to close the valve until another mould is ready for the first layer.

The mould is then uniformly moved along the horizontal plane, which is lowered by the operator at the time the layer from receptacle 12 has been completed. After the mould has been positioned under receptacle 11 at the left end, the valve on receptacle 11 is opened and the mould simultaneously moved to the left. At 129 is shown the layer from receptacle 12, and at 130 is shown a portion of the layer from receptacle 11 the operation being but partly carried out as to the positioning of the materials from receptacle 11. It will be noted that the materials flow out from the positioning nozzle shown at 128 and by the uniform motion of the mould 37 the discharging materials are laid horizontally disposed as shown in the mould 37. A similar operation is carried out when the mould is placed under receptacle 10, which completes the positioning of the materials in this instance.

Any class of materials of the consistency of ice cream mixes can be similarly treated in the manufacture of confection and bakery products, certain classes of cheese products which are usually marketed in brick form, such as whole milk cheese, skim milk cheese, cheese compounds, and the like, proteinized food products, milk chocolate compounds, and other compositions of matter.

When ice cream mixes are positioned in layer form in moulds they are immediately placed in refrigeration, the rooms being provided with what is known as a hardening temperature. In Fig. 6, at 104 is shown a conventional refrigerating room, the pipes being shown at 133, with the entrance at 105. Many other products susceptible to positioning treatment are placed in refrigerating rooms for preserving, hardening and contracting purposes. Where confections are placed in moulds, the contraction resulting from refrigeration enables the materials to be turned out of the moulds much more readily than would be possible in the presence of a temperature approximating the atmosphere.

The present hand method of manufacturing ice cream bricks involves, approximately, the use of 23 degrees Fahrenheit for the lower layer, 24 degrees for the center layer, and 25 degrees for the top layer. By my process of positioning the layers with the apparatus described I employ 27 degrees Fahrenheit for the lower layer, 27.5 degrees for the center layer, and 28 degrees for the top layer, thereby effecting material economy in the time required to operate the freezers, and the correspondingly less time and labor employed, in addition to the saving of materials resulting from the use of higher temperatures.

In my process the positioning nozzle as shown at 128 is substantially the same width as the inner measurement width of the mould, and as a result no materials are deposited upon the sides of the mould and there is a noticeable uniformity of thickness of the layers which is pleasing to the eye. My process is as near a sanitary process for the production of ice cream bricks as it seems possible to perfect.

When products of heavy consistency are treated by my process, such as heavy condensed whole milk which is usually impregnated with a cheese flavor, or a combination of condensed milk, sugar and ground chocolate adapted for milk chocolate bricks or bars, the materials are first introduced into the container shown at 120, and while in a heated condition, are allowed to flow into the containers shown at 10, 11 and 12. In such cases, the valves shown at 114, 111, 131 and 132 are closed, and the valves shown at 117, 116, and 112 are opened and compressed air from the compressor shown at 106 is permitted to flow through the pipe 107 to the pipe 115 and therefrom to the horizontally disposed pipe 113 which is connected with the vertically disposed receptacles shown at 10, 11 and 12. By the aid of compressed air very heavy materials can be forced in layer form out of the receptacles through the positioning nozzles and into the moving moulds. Such materials are then placed in the refrigerator shown at 104, and contracted, then removed from the moulds and wrapped for the market.

Where pastry products are treated by my process, such as materials for the production of layer cakes where each layer is of a different color and flavor, or where the same flavoring and coloring materials may be utilized in single layers to be later placed one upon another, the materials after being positioned in the moulds are then placed in the oven shown at 100, provided with the door shown at 101, and the furnace shown at 102, to which is connected the offtake pipe shown at 103.

While the apparatus shown is adapted to carry out my process, various features of the mechanism may be duplicated as to functions by other apparatus without deviating from my invention, it being understood that the particular apparatus herein disclosed in illustration of a means for carrying out the process of this invention forms the subject matter of a separate application.

When the moulds have received their layers from receptacles 12, 11 and 10, respectively, and the elevated plane is lowered to normal position, the moulds are removed from the plane of the support shown at 70 to an adjoining support, such as shown at 149, conveniently located preparatory to removing into the refrigerating room shown at 104. The support 149 affords a suitable platform on which to store both moulds and lids, it being proper to immediately place the lids on the moulds, and thereafter to substantially immediately place the moulds in refrigeration, to obviate the detrimental effects from exposure to atmospheric conditions. The adjoining support 149 is mounted upon the legs 20 and brace at 19.

My invention is adapted for use with a single receptacle as the ice cream maker can fill the moulds with one mix, run one layer in each mould, place them in the hardening room, and thereafter introduce the materials for the second layer in the same receptacle and repeat the operation by placing the second layer over the first, and thereafter a third layer can be placed by like procedure, until the materials have been positioned as desired.

Again, it is obvious that the pipe 113, with its connections to the receptacles 10, 11 and 12, can be disconnected and the materials introduced into 10, 11 and 12, by pouring direct from any suitable container, but, it is obvious that the materials must be taken direct from the freezers in order that they will be introduced at as low a temperature as possible in order to avoid losses of refrigeration.

When air is applied to the upper surfaces of the mixes in the containers 10, 11 and 12, or any of them, the pressure required is but fractional as the mixes themselves are heavy, and the lower portion of the receptacles, with their pointed extremities are compelled to support a material weight. In case air pressure is to be employed to assist in the discharge of high density products the air may be conveniently introduced into the pipe 61, provided with the valve 62 and the pressure indicator 63, which is suitably connected with the vertically disposed container 11. It will be noted that 11 is provided with the pipe 66 and the safety valve 67 to insure that a sufficiently high pressure is not employed to cause any detrimental effects upon the products to be positioned by the nozzle 128.

A detailed view of the nozzle 128 is seen in Fig. 7, wherein 95 represents the wall of receptacle 11. It will be noted that the right side of the lower extremity of the nozzle is lower than the left side, the reason for this being that when the cream emits from the nozzle by giving it freedom in the direction in which the mould is traveling it affords the material an opportunity to turn over gradually from a vertically disposed position to a horizontally disposed position which opportunity would not be afforded if the nozzle was uniform at its emitting surfaces. I regard this nozzle formation as one of the important features of my invention when taken into consideration with the invention as a whole.

What I claim is:

1. The process of making brick ice cream which consists in preforming and successively depositing a plurality of layers of partly frozen material one on top of the other, and then exposing the mass to a freezing temperature.

2. The process of making brick ice cream which consists in depositing a plurality of layers of partly frozen material of predetermined width and thickness one successively on top of the other, maintaining the position and dimensions of the superposed layers and subjecting them to a hardening temperature.

3. The process of making brick ice cream which consists in depositing a plurality of layers pre-formed of partly frozen material successively one on top of the other and then subjecting the same to a hardening temperature.

4. The process of making brick ice cream which consists in flowing partly frozen material successively into a container to form a succession of layers one on top of the other, and then lowering the temperature of the mass to harden the same.

5. The process of making brick ice cream which consists in forming a plurality of ribbons of partly frozen material of predetermined uniform dimensions, and flowing said ribbons as they are formed in successive superimposed layers one on top of the other in a container and then lowering the temperature of the mass to harden the same.

WILSON R. MYERS.

Witnesses:
W. T. Du Bois,
Guy G. Shonkurler.